US011435873B1

United States Patent
Sharma et al.

(10) Patent No.: US 11,435,873 B1
(45) Date of Patent: Sep. 6, 2022

(54) USER INTERFACE FOR IDENTIFYING SUBSTITUTE ITEMS

(71) Applicant: Amazon Technologies, Inc., Seattle, WA (US)

(72) Inventors: Shaleen Kumar Sharma, Seattle, WA (US); Andrew Nienhaus, Seattle, WA (US); Qingxin Wang, Issaquah, WA (US); Xinyue Wang, Bellevue, WA (US); Thea Pedroza, Seattle, WA (US); Francesco Carbone, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 431 days.

(21) Appl. No.: 16/217,726

(22) Filed: Dec. 12, 2018

(51) Int. Cl.
| | |
|---|---|
| *G06F 3/0482* | (2013.01) |
| *G06F 16/958* | (2019.01) |
| *G06F 16/9538* | (2019.01) |
| *G06N 20/00* | (2019.01) |

(52) U.S. Cl.
CPC ......... *G06F 3/0482* (2013.01); *G06F 16/958* (2019.01); *G06F 16/9538* (2019.01); *G06N 20/00* (2019.01)

(58) Field of Classification Search
CPC .. G06F 3/0482; G06F 16/958; G06F 16/9538; G06N 20/00
See application file for complete search history.

(56) References Cited

U.S. PATENT DOCUMENTS

| | | |
|---|---|---|
| 6,185,558 B1 | 2/2001 | Bowman et al. |
| 6,438,579 B1 | 8/2002 | Hosken |
| 6,963,867 B2 | 11/2005 | Ford et al. |
| 7,389,294 B2 | 6/2008 | Kotas et al. |
| 7,483,846 B1 | 1/2009 | Kumar et al. |
| 7,680,703 B1 | 3/2010 | Smith |
| 7,765,130 B2 | 7/2010 | McQueen, III et al. |
| 7,930,393 B1 * | 4/2011 | Baumback .......... G06F 11/3409 709/224 |
| 7,953,740 B1 | 5/2011 | Vadon et al. |
| 8,145,512 B1 | 3/2012 | Henne et al. |

(Continued)

OTHER PUBLICATIONS

Call-to action that works: above or below the fold? Author: Digital Marketing URL: https://acodez.in/call-action-works-fold/ (Year: 2017).*

*Primary Examiner* — Mandrita Brahmachari

(74) *Attorney, Agent, or Firm* — Knobbe, Martens, Olson & Bear, LLP

(57) ABSTRACT

An improved user interface in which related items are organized in a manner that is intuitive to a user, and ultimately results in the number of navigational steps performed by the user to identify desired items being reduced, is described herein. For example, instead of having a user interface display a large number of related items, a recommendation system can identify a single item related to an item initially selected by the user that is associated with one or more factors a user likely finds important in deciding which item to select, and produce data that results in a user interface that displays the single related item. Optionally, the user interface can display the single related item in an above-the-fold (ATF) portion of the user interface such that the single related item is visible to a user without the user having to interact with the user interface.

14 Claims, 8 Drawing Sheets

(56) References Cited

U.S. PATENT DOCUMENTS

| | | | |
|---|---|---|---|
| 8,195,663 B1* | 6/2012 | Hall | G06F 16/951 |
| | | | 707/736 |
| 8,275,674 B2 | 9/2012 | Kane, Jr. et al. | |
| 8,316,124 B1* | 11/2012 | Baumback | H04L 67/22 |
| | | | 709/224 |
| 8,326,658 B1 | 12/2012 | Lee et al. | |
| 8,326,690 B2 | 12/2012 | Dicker et al. | |
| 8,484,099 B1 | 7/2013 | Pope et al. | |
| 8,660,912 B1* | 2/2014 | Dandekar | G06Q 30/06 |
| | | | 705/26.1 |
| 2001/0021914 A1 | 9/2001 | Jacobi et al. | |
| 2007/0288468 A1 | 12/2007 | Sundaresan et al. | |
| 2009/0094095 A1 | 4/2009 | Slaney et al. | |
| 2009/0192808 A1 | 7/2009 | Sela | |
| 2011/0321003 A1* | 12/2011 | Doig | G06F 8/34 |
| | | | 717/107 |
| 2012/0101918 A1 | 4/2012 | Battle et al. | |
| 2012/0109778 A1 | 5/2012 | Chan et al. | |
| 2012/0316986 A1 | 12/2012 | Levy et al. | |
| 2013/0030952 A1* | 1/2013 | Musgrove | G06Q 30/0253 |
| | | | 705/26.7 |
| 2013/0066819 A1 | 3/2013 | Nice et al. | |
| 2013/0084000 A1 | 4/2013 | Bhardwaj et al. | |
| 2013/0196297 A1 | 8/2013 | Anwar | |
| 2013/0282517 A1* | 10/2013 | Kreiner | G06Q 30/06 |
| | | | 705/26.7 |
| 2013/0283307 A1 | 10/2013 | Avedissian et al. | |
| 2014/0304277 A1 | 10/2014 | Veugen et al. | |
| 2014/0351079 A1* | 11/2014 | Dong | G06Q 30/0631 |
| | | | 705/26.7 |
| 2015/0095185 A1 | 4/2015 | Katukuri et al. | |
| 2015/0112836 A1* | 4/2015 | Godsey | G06Q 30/0613 |
| | | | 705/26.41 |
| 2015/0304717 A1* | 10/2015 | Kim | H04N 21/44222 |
| | | | 725/59 |
| 2017/0046011 A1* | 2/2017 | Piper | H04L 67/22 |
| 2018/0218428 A1* | 8/2018 | Xie | G06N 20/00 |
| 2018/0218431 A1* | 8/2018 | Prendki | G06Q 30/0631 |

* cited by examiner

… (1)

USER INTERFACE FOR IDENTIFYING SUBSTITUTE ITEMS

BACKGROUND

Content pages (e.g., a web page, a network page transmitted and/or received over a network other than the Internet, etc.) are commonly generated dynamically in response to page requests from user devices, and are presented in user interfaces. The content of the generated content page can vary based on various factors, such as attributes of the user device, a context of the current browsing session, actions performed by the user in prior browsing sessions, and/or the like. Ideally, the content selected to be included in a generated content page is of value for presenting to the user operating the user device. However, it can be difficult to identify and display the content in a manner that minimizes the number of user interactions with the content page and/or the number of content pages requested by the user as the user attempts to identify desired content.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
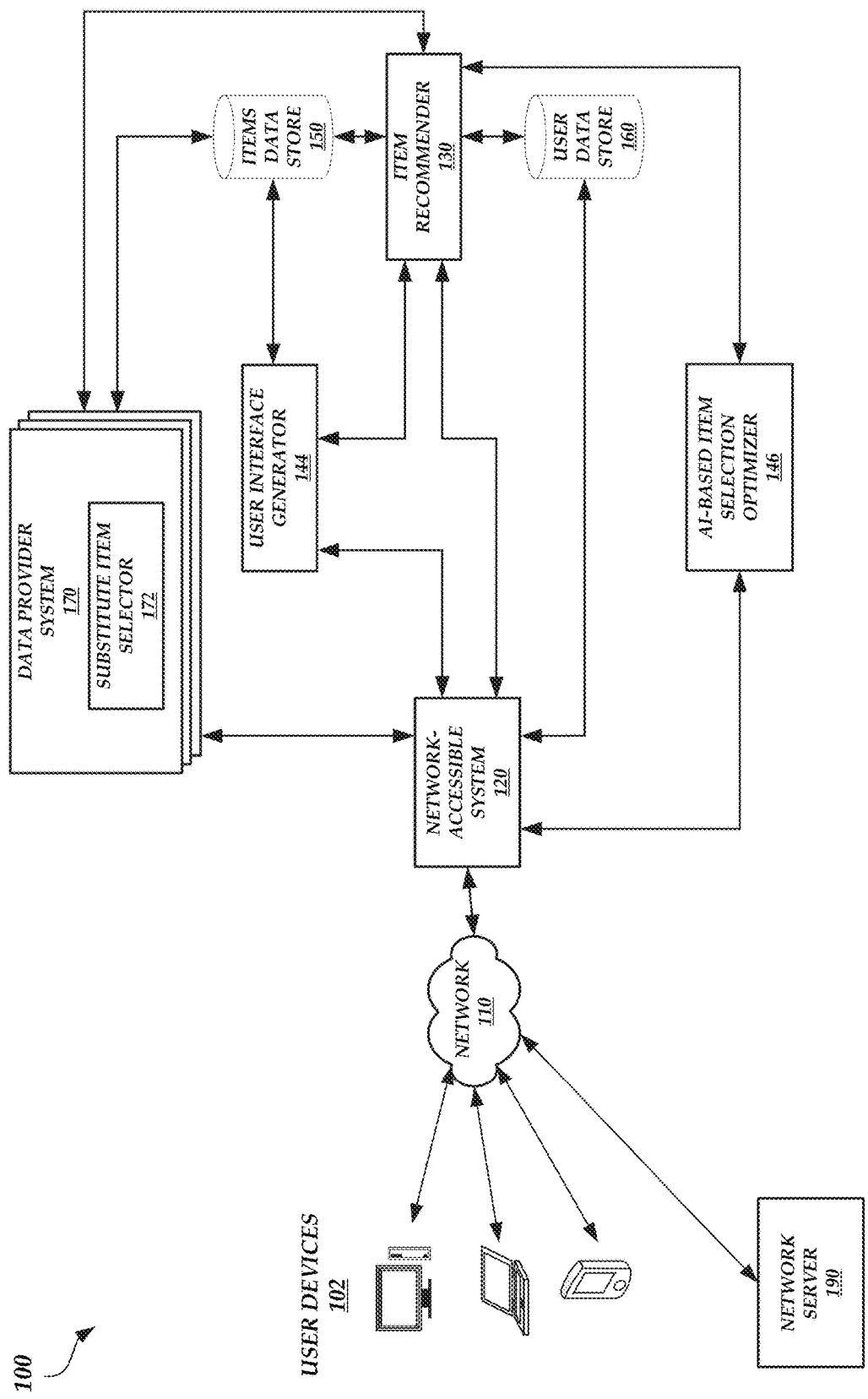
FIG. 1 is a block diagram of an illustrative operating environment in which a recommendation system uses related item data to identify a substitute item and generate data for causing user interfaces to display the substitute item, in one embodiment.

As described above, it can be difficult to identify and display the content in a manner that minimizes the number of user interactions with the content page and/or the number of content pages requested by the user as the user attempts to identify desired content. For example, when a user is viewing a first item in an electronic catalog, conventional network-based systems (e.g., conventional recommendation systems) may display other, related items available in the electronic catalog. Because screen space may be limited, a few of the related items may initially be displayed in a single window or portion of the content page in a sequential order. The user may be able to view other related items that are not initially displayed by selecting arrow buttons, scrolling, and/or the like. This manner of displaying the related items may be referred to herein as a "carousel view."

In some cases, there may be a large number of related items (e.g., hundreds of related items) in the carousel view. Thus, a user may have to select the arrow buttons several times, scroll for a long period of time, etc. before arriving at a related item that may be of interest to the user. Thus, the number of navigational steps that a user may have to take to arrive at a desired related item can be high.

In addition, the network-based system may order the related items based on a likelihood that a user may select and/or obtain the related item (e.g., related items may be ordered based on a degree of relatedness to the item initially selected by a user, where relatedness between two items may be measured based on, for example, how frequently the two items are purchased in combination or are viewed within the same browsing session). However, the manner in which the related items are ordered may not be apparent to a user. In fact, the order may make no logical sense to the user. For example, the item initially selected by the user may have a set of item features or attributes, be associated with a certain price, be associated with a certain set of reviews or ratings, be associated with a certain return likelihood (e.g., a likelihood that the item will be returned after purchase), be associated with a certain shipping speed, be associated with a certain shipping cost, be associated with a certain membership program or subscription (e.g., available to users that are members of the program or subscription), be a certain age, be a certain version, be in a certain condition (e.g., used, new, refurbished, etc.) and/or the like. When presented with a choice between the initially-selected item and related items, the most important factor(s) the user may consider in deciding which item(s) to select and obtain can include which item(s) have a specific item feature or attribute, are cheaper or more expensive, have better or worse reviews or ratings, have lower or higher return likelihoods, have faster or slower shipping speeds, have free or non-free shipping costs, are associated or are not associated with certain membership programs or subscriptions, are newer or older, are a newer or older version, and/or are used, new, refurbished, etc. The network-based system, however, is not ordering the related items based on the factor(s) the user finds most important in deciding which item(s) to select and obtain. Thus, there may be situations in which the first related item in the carousel view is associated with a factor that the user likely finds important in making the item selection decision, the second, third, and fourth related items in the carousel view are not associated with any factor that the user likely finds important in making the item selection decision, the fifth related item is associated with a factor that the user likely finds important in making the item selection decision, and so on. The user may be unsure of how many related items in the carousel view are associated with a factor that the user likely finds important in making the item selection decision and therefore when to stop browsing through the carousel view. This can result in the user prematurely stopping a browse through the carousel view and missing related items that may be of interest to the user.

Accordingly, described herein is an improved user interface in which related items are organized in a manner that is intuitive to a user, and ultimately results in the number of navigational steps performed by the user to identify desired related items being reduced. For example, instead of having a user interface that displays a carousel view that includes a large number of related items, a recommendation system can identify a single item related to an item initially selected by the user (e.g., a substitute item) that is associated with one or more factors a user likely finds important in deciding which item to select, and obtain and produce data that results in a user interface that displays the single related item. Optionally, the user interface can be configured to display the single related item in an above-the-fold (ATF) portion of the user interface and/or above a user interface element (e.g., a display object, a button, a menu, a text field, a drop-down box, etc.) that allows a user to obtain the initially-selected item (e.g., an "add to cart" button) such that the single related item is visible to a user without the user having to interact with the user interface, and/or is visible to the user when the user is making a purchase decision (e.g., the user cannot obtain the initially-selected item without first viewing the single related item). As used herein, ATF generally corresponds to a portion of rendered content, such as a content page or a network application (e.g., web application), that is initially visible or otherwise perceivable to a user of a user device without scrolling. The recommendation system can generate a label for the single related item such that a user can clearly identify why the item was selected as a related item and/or how or why the item is better than the initially-selected item (e.g., the label can identify the factor(s) that the user likely considers important in making an item selection decision and that are associated with the single related item). Thus, a user would not have to browse through a list of related items ordered in an unfamiliar manner. Rather, a user can immediately view a related item and the reason why the item is being recommended. Thus, a user interface that displays a single related item identified by the recommendation system results in a more intuitive related item browsing process, thereby reducing the number of navigational steps performed to identify desired content.

In particular, as described above, the task of navigating a large electronic catalog of items (e.g., a catalog with over one thousand items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory, and/or by navigating a carousel view. Typically, however, the browse tree includes several levels of categories, requiring the user to navigate through several levels of browse nodes or category pages to arrive at the subcategory of interest and/or the carousel view includes a large number of items ordered in a sequential manner. Further, in many cases as described above, the items of interest are not accurately or intuitively categorized, requiring the user to perform additional navigation or keyword searching (e.g., additional page requests, additional scrolling, additional selecting of browsing arrow buttons, etc.). Thus, the user frequently has to perform numerous navigational steps to arrive at the catalog page or "item detail page" of interest.

Recommendation algorithms and user interfaces of the type disclosed herein significantly reduce this problem, allowing users to locate items of interest with fewer steps. For example, in the embodiments described herein, when the user is presented with a catalog page, a single item to be recommended to the user is marked with a label that clearly identifies why the item is being recommended (e.g., how or why the item is better than the item initially selected by the user). See, e.g., FIGS. 5A-5B and 6, discussed below, which depict an item detail page for a particular type of paper towels, and which shows a labeled display object 530 in an ATF portion of the item detail page that highlights the single item being recommended. The item recommendation preferably includes, or is in the form of, a link to the catalog's item detail page for the corresponding item, allowing the user to navigate directly to this page. The user can then view fewer items (thereby requiring fewer navigational steps), and the recommendation thus serves as a programmatically selected navigational shortcut to the item's detail page or description (thereby allowing the user to bypass the navigational structure of the browse tree). Beneficially, programmatically identifying an item of interest, marking the item with a label that clearly identifies why the item is identified as being of interest (e.g., how or why the item is better than the initially-selected item), and presenting the user with navigational shortcuts to the items can improve the speed of the user's navigation through the electronic catalog, rather than requiring the user to page through multiple other pages to locate the recommended item via the browse tree, via searching, and/or via browsing through a carousel view. This can be particularly true for computing devices with small screens (e.g., smartphones), where fewer items can be displayed to the user at a time and thus navigation of larger volumes of items is more difficult.

In addition, by not having to navigate through many user interfaces to locate items of interest, the user may request fewer catalog pages (e.g., item detail pages, content pages, etc.). Accordingly, there is less computational burden on the server that generates and serves the pages and/or less computational burden on the user device operated by the user that would normally request the pages. Furthermore, by requesting fewer catalog pages, there may be fewer network calls sent over the network by the server and/or user device, which reduces congestion and increases the amount of available network bandwidth. Given that the number of network calls sent over the network each day can be in the millions to billions, the computational and/or network usage savings provided by the recommendation algorithms and user interfaces of the type disclosed herein can add up quickly.

While the present disclosure is described with respect to the recommendation system identifying a single related item and producing data that results in a user interface that displays the single related item, this is not meant to be limiting. For example, the recommendation system can identify any number of related items using similar techniques as described herein and produce data that results in a user interface that displays one or more of the related items. As an illustrative example, if the recommendation system identifies multiple related items, the recommendation system may produce data that results in a user interface that displays simultaneously one or more of the related items (e.g., in a same display object and associated with the same label, in a same position in the user interface, etc.). Optionally, the one or more related items may be displayed in the ATF portion of the user interface. As another example, the recommendation may identify the single related item and one or more additional sets of related items to produce a tier of recommendations. The recommendation system can then produce data that results in a user interface that displays the single related item, a first set of related items below the single related item in the user interface, a second set of related items below the first set of related items in the user interface, and so on. The single related item may be displayed in the ATF portion of the user interface, while the sets of related items may be displayed in the ATF portion of the user interface and/or in a below-the-fold (BTF) portion of the user interface. As used herein, BTF generally corresponds to a portion of rendered content, such as a content page or a network application, that is initially invisible or otherwise unperceivable to a user of a user device without scrolling.

The foregoing aspects and many of the attendant advantages of this disclosure, including the above-referenced technical benefits, will become more readily appreciated as the same become better understood by reference to the following detailed description, when taken in conjunction with the accompanying drawings.

Example Recommendation Environment

FIG. 1 is a block diagram of an illustrative operating environment 100 in which a recommendation system uses related item data to identify a substitute item and generate data for causing user interfaces to display the substitute item, in one embodiment. The operating environment 100 includes end user devices 102, a network-accessible system 120, and various modules, components, data stores, and/or the like that may comprise the recommendation system, including an item recommender 130, a user interface generator 144, an artificial intelligence-based item selection optimizer 146, an items data store 150, a user data store 160, and one or more data provider systems 170.

The various modules, components, data stores, and/or the like of the recommendation system may collectively identify a substitute item and generate user interface data such that the substitute item is displayed in an ATF portion of a user interface (e.g., in a content page displayed by a user device 102).

For example, each data provider system 170 may include a substitute item selector 172. The substitute item selector 172 may identify a potential substitute item related to an item initially selected by a user. As described below, each data provider system 170 may manage a different set of items available in the electronic catalog (where the sets may partially overlap), and therefore each substitute item selector 172 can identify the same or different potential substitute item. Each substitute item selector 172 of each data provider system 170 may perform the same and/or different operations in identifying a potential substitute item. For example, the user device 102 can request a content page from the network-accessible system 120 via the network 110. The network-accessible system 120 may generally serve as network-facing component that receives requests for content pages from user devices 102 and provides corresponding data to the user devices 102 in response (e.g., user interface data that, when rendered by a user device 102, causes the user device 102 to display or otherwise present a requested content page). Once a request is received, the network-accessible system 120 can forward the request to one or more of the data provider systems 170 (e.g., the substitute item selector(s) 172). The request can include an identification of the item corresponding to the requested content page (e.g., the item detail page), which is referred to herein as the item initially selected by the user.

The network-accessible system 120 can also obtain a context of the item initially selected by the user (e.g., items (or item detail pages) previously viewed by the user before the user selected the item, a search query provided by the user that resulted in a user selecting the item (e.g., a keyword, a selection of a category and/or subcategory in a browse tree, etc.), an indication of which search queries led to selection of the item and a purchase of the item, etc.), and provide the item context to the substitute item selector(s) 172 as well. In one example of the operations performed by a substitute item selector 172 to identify a potential substitute item, the substitute item selector 172 can use the item context to identify a search query provided by a user that resulted in the user selecting the initial item. Alternatively, the network-accessible system 120 can provide the search query to the substitute item selector 172. The items data store 150 may store an indication of various items available in an electronic catalog, attributes of such items (e.g., item features or attributes, price, reviews and/or ratings, return likelihood, available shipping speeds, shipping costs, membership program or subscription eligibility, item age, item version, item condition, images, etc.), contexts of such items, and/or the like. Thus, the substitute item selector 172 can query the items data store 150 to identify other items available in an electronic catalog that were also selected as a result of a user providing the same identified search query. As an illustrative example, if a user entered the keyword "paper towels" as a search query and subsequently selected the initially-selected item, the substitute item selector(s) 172 can query the items data store 150 to identify other items that were also selected as a result of any user providing the keyword "paper towels" as a search query.

The substitute item selector 172 can then, for one or more of the identified other items, identify whether the respective item corresponds to the same or similar financial categorization (e.g., prices of each item are within a threshold value or percentage of each other, quantities or sizes of each item are within a threshold value or percentage of each other, etc.) and/or browse structure (e.g., a browse tree in which the items are arranged by one or more levels of categories and/or subcategories, where the browse tree can be visually represented by a navigational menu available on an item detail page) as the item initially selected by the user. For example, an item having the same or similar financial categorization and/or browse structure as another item may indicate that both items are comparable to each other and/or can be considered substitutes of one another. The substitute item selector 172 can assign other items having the same or similar financial categorization and/or browse structure as the item initially selected by the user with a low confidence score. The substitute item selector 172 can further identify which of these other items having the same or similar financial categorization and/or browse structure as the item initially selected by the user were purchased as a result of any user providing the identified search query. The substitute item selector 172 can assign other items having the same or similar financial categorization and/or browse structure as the item initially selected by the user and that were purchased as a result of any user entering the identified search query with a medium or high confidence score.

The substitute item selector 172 can then query the items data store 150 to obtain attribute information for the item initially selected by the user and for any of the other items assigned a low, medium, or high confidence score. The substitute item selector 172 can compare the attributes to identify a potential substitute item. For example, the substitute item selector 172 can train or otherwise obtain a model that outputs an indication of a potential substitute item when provided with attributes of a subject item (e.g., the item initially selected by the user) and attributes of one or more potential substitute items (e.g., the other items assigned a low, medium or high confidence score) as inputs. Initially, the model may output, as a potential substitute item, one of the other items that has been assigned a higher score and/or is associated with a positive factor (e.g., cheaper than the item initially selected by the user, better reviewed or rated than the item initially selected by the user, lower return likelihood than the item initially selected by the user, faster shipping speeds than the item initially selected by the user, free shipping, exclusive to members of a program or subscription, newer, newer version, in a new condition, in an old condition, in a refurbished condition, etc.). As described in greater detail below, the model may be adjusted, updated, and/or re-trained based on feedback provided by the AI-based item selection optimizer 146 such that the model outputs moving forward a potential substitute item according to the adjustment, update, and/or re-training. Once identified, the substitute item selector 172 can forward an indication of the potential substitute item to the item recommender 130. Thus, the item recommender 130 can receive a single potential substitute item (e.g., if only one data provider system 170, and therefore one substitute item selector 172, is present in the environment 100) or multiple potential substitute items (e.g., if multiple data provider systems 170, and therefore multiple substitute item selectors 172, are present in the environment 100, where zero or more potential substitute items may originate from each substitute item selector 172 present in the environment 100).

The item recommender 130 can be configured to receive data from the network-accessible system 120, receive data from one or more of the data provider systems 170, and/or access the items data store 150 and/or the user data store 160 to identify a substitute item available in an electronic catalog that is related to an item initially selected by a user (e.g., an item in an electronic catalog that a user is currently viewing, an item in an electronic catalog that a user will view in the future, etc.). The item recommender 130 can then provide an identification of the substitute item to the user interface generator 144.

For example, the item recommender 130 can receive, as an input from the network-accessible system 120, an identification of an item initially selected by a user, a context of the item initially selected by the user, an identity of a user and/or user device 102, and/or a user context (described below). Each of the data provider systems 170 can also provide to the item recommender 130 one or more potential substitute items (e.g., based on operations performed by the substitute item selector(s) 172). The item recommender 130 can then query the items data store 150 to identify attributes of the item initially selected by the user and/or the potential substitute item(s) identified by the substitute item selector(s) 172. The item recommender 130 can also query the user data store 160 to identify data associated with the user or user device 102, such as user interests, user hobbies, user age, user gender, user purchase history, user search history and/or current search queries, user subscriptions, actions performed by the user in prior browsing sessions, parts of a screen a user typically clicks while browsing, a time of day, a season of the year, etc. (collectively referred to herein as a "user context"). Alternatively, the item recommender 130 can receive the user context directly from the network-accessible system 120, and therefore may not query the user data store 160.

In an embodiment, the item recommender 130 ranks the potential substitute item(s) provided by the substitute item selector(s) 172 using a machine learning model. For example, the item recommender 130 can apply the attributes of the item initially selected by the user, attributes of the potential substitute item(s), the context of the item initially selected by the user, and/or the user context as inputs as inputs to the machine learning model. In response to receiving the inputs, the machine learning model may rank the potential substitute item(s) using a multi-armed bandit approach. For example, several strategies for ranking potential substitute item(s) may be available. Such strategies can include ranking potential substitute item(s) based on which are cheapest (or most expensive), based on which have higher (or lower) reviews and/or ratings, based on which are less likely (or more likely) to be returned after purchase, based on which are associated with faster (or slower) shipping speeds, free (or non-free) shipping costs, based on which are associated (or are not associated) with a membership program or subscription, based on which are younger (or older) items, based on which are newer (or older) versions, based on which are in a new (or used, refurbished, etc.) condition, and/or the like. The machine learning model can initially generate multiple rankings, where each ranking is based on one of the strategies described above. The machine learning model can then use the user context to identify which strategy results in the best performance (e.g., is most likely to result in a user purchasing a substitute item). In other words, the machine learning model can use the user context to identify which set of rankings includes substitute items ranked near or at the top that are most likely to result in a user purchasing a substitute item. The machine learning model may then output a ranking of one or more potential substitute items and a strategy used to perform the ranking.

The item recommender 130 can then forward an identification of a single potential substitute item and an indication of the strategy to the user interface generator 144. For example, the single potential substitute item may be the highest ranked potential substitute item. The single potential substitute item output by the machine learning model may be considered to the substitute item to display in a subsequent user interface, as described below. In other embodiments, the item recommender 130 can forward an identification of multiple potential substitute items, indicating the order in which the potential substitute items are ranked. Such potential substitute items may be the top N ranked potential substitute items.

Alternatively, the item recommender 130 may not actively rank potential substitute items. Rather, the item recommender 130 may receive a single potential substitute item identified by a first data provider system 170, a single potential substitute item identified by a second data provider system 170, etc. Generally, each data provider system 170 may manage a set of items available in the electronic catalog that are related in some manner. For example, the set of items managed by a first data provider system 170 may be items manufactured or otherwise offered by a particular entity. Instead of the item recommender 130 evaluating potential substitute items provided by the data provider system(s) 170, each data provider system 170 (e.g., each substitute item selector 172) can internally determine the best potential substitute item (e.g., using attributes associated with the item initially selected by the user, the user context, etc.) and provide an indication of this potential substitute item to the item recommender 130. The item recommender 130 can prioritize the data provider systems 170 using a static logic, and output the potential substitute item identified by the highest priority data provider system 170 as the substitute item to be displayed in a user interface. In further embodiments, each data provider system 170 (e.g., each substitute item selector 172) can internally determine the best set of potential substitute items and provide an indication of this best set of potential substitute items to the item recommender 130. The item recommender 130 can prioritize the data provider systems 170 using a static logic, and output the best set of potential substitute items identified by the highest priority data provider system 170 as the substitute items to be displayed in a user interface.

Because the item recommender 130 may use a static logic, the item recommender 130 can further cache a mapping between the item initially selected by the user and the substitute item(s). Thus, if the user selects the same initial item in the future, the item recommender 130 may not need to obtain potential substitute items from the data provider systems 170. Rather, the item recommender 130 can simply access the cache and provide the substitute item(s) to the user interface generator 144 as a result.

In some embodiments, the item recommender 130 is external to the network-accessible system 120, the data provider systems 170, the user interface generator 144, and the AI-based item selection optimizer 146. In other embodiments, not shown, the item recommender 130 is internal to one or more of the network-accessible system 120, the data provider systems 170, the user interface generator 144, and the AI-based item selection optimizer 146. Additional details of the process by which an item recommender 130 or other like system identifies related items (e.g., a personalized set of items available in an electronic catalog to recommend to a user based on user activity) is described in U.S. Pat. No. 7,685,074, titled "DATA MINING OF USER ACTIVITY DATA TO IDENTIFY RELATED ITEMS IN AN ELECTRONIC CATALOG" ("the '074 patent"), which is hereby incorporated by reference herein in its entirety. The related items identified by the item recommender 130 or other like system, can, but need not be, personalized to a particular user.

The user interface generator 144 can generate a user interface for display on a user device 102 in response to a user device 102 requesting a certain content page. For example, the user interface generator 144 can receive an identification of at least one potential substitute item (e.g., the substitute item to display in a user interface) and an indication of the strategy used to rank potential substitute items from the item recommender 130. The user interface generator 144 may generate a label for the substitute item (or each of the substitute items, if there are multiple substitute items provided) using one of several label templates. A label template can include template text that identifies a strategy used to rank potential substitute items. Thus, the user interface generator 144 can select a particular label template based on the strategy indicated by the item recommender 130. Some label templates may include template text and a blank portion that the user interface generator 144 can fill in based on attributes of the item initially selected by the user and/or the substitute item. For example, label templates can include "Cheaper" (where the blank portion is filled with a percentage that reflects a price difference between the item initially selected by the user and the substitute item), "Better Reviewed," "Fewer Returns," "Faster Shipping," "Free Shipping," "Available Exclusively to Members of" (where the blank portion is filled with a name of a program or subscription, "Alternate Item Available to Non-Members of" (where the blank portion is filled with a name of a program or subscription), "Newer Item," "Older Item," "Newer Version of Item," "Older Version of Item," "Refurbished Version of Item," etc. These examples are merely for illustrative purposes and are not meant to be limiting.

Once the label is created, the user interface generator 144 can retrieve attributes of the item initially selected by the user from the items data store 150. The user interface generator 144 can also retrieve, from the items data store 150, attributes of the substitute item, and use the obtained information to generate user interface data that, when rendered by the user device 102, causes the user device 102 to display or otherwise present a requested content page in a user interface with a portion of the user interface dedicated to the substitute item. The user interface generator 144 can transmit the user interface data to the network-accessible system 120, and the network-accessible system 120 can transmit the user interface data to the user device 102 to satisfy the initial request. Example user interfaces, and the unique features presented therein, are described in greater detail below with respect to FIGS. 5A-5B and 6.

The substitute item selector(s) 172 can perform the operations described herein in real-time once the user has requested a content page (e.g., an item detail page) corresponding to a particular item. In other words, the substitute item selector(s) 172 can perform the operations described herein as part of the process to generate a requested content page. Alternatively or in addition, the substitute item selector(s) 172 can perform some or all of the operations described herein after a user provides a search query and before a user requests the content page corresponding to a particular item. For example, the search query may result in the user viewing a list of search results. The substitute item selector(s) 172 can perform some or all of the operations described herein for some or all of the items corresponding to the search results. As a result, the item recommender 130 may identify a substitute item prior to the user requesting the content page corresponding to a particular item. By predetermining the substitute item, the user interface generator 144 can more quickly generate a requested content page, thereby reducing user device 102 page load latency.

As a user of the user device 102 interacts with the provided user interface (and/or multiple users interacts with multiple provided user interfaces), the user device 102 may transmit feedback data to the network-accessible system 120, and the network-accessible system 120 can transmit the feedback data to the AI-based item selection optimizer 146 and/or the item recommender 130. The AI-based item selection optimizer 146 can use the feedback data to, for example, update the process by which the item recommender 130 identifies a substitute item in the future and/or to update the process by which the substitute item selector(s) 172 identify a potential substitute item in the future.

For example, the feedback data may indicate the strategy that resulted in a substitute item being displayed in a user interface, which substitute items displayed in a user interface were selected by a user, which substitute items displayed in a user interface were selected and purchased by a user, which substitute items displayed in a user interface resulted in a user navigating to another item detail page corresponding to another item, and/or the like. The AI-based item selection optimizer 146 can apply the feedback data as an input to a machine learning model, and the machine learning model can produce an output identifying which strategies (e.g., positive factors) and/or item attributes were more likely to lead to a particular user selecting and/or purchasing an item. The AI-based item selection optimizer 146 can then use the machine learning model output to adjust, update, and/or re-train the machine learning model used by the item recommender 130 to rank potential substitute items and/or to adjust, update, and/or re-train the model used by a substitute item selector 172 to identify a potential substitute item. The AI-based item selection optimizer 146, therefore, can improve the functionality of the recommendation system by causing the item recommender 130 and/or the data provider system(s) 170 to produce more accurate substitute items. This, in turn, can reduce the number of navigational steps a user may perform to identified desired items.

The data provider system(s) 170, the user interface generator 144, and/or the item recommender 130 may perform the operations described herein in parallel with other operations performed by the network-accessible system 120 and/ or other components in the environment 100 (not shown) to, for example, provide a user device 102 with access to an item detail page. Thus, the operations performed by the data provider system(s) 170, the user interface generator 144, and/or the item recommender 130 as described herein may not negatively impact the user device 102 page load latency.

As described above, a data provider system 170 may manage a set of items available in the electronic catalog that are related in some manner. For example, the set of items managed by a first data provider system 170 may be items manufactured or otherwise offered by a particular entity, may correspond to a same category or subcategory of items, may each be reviewed or rated above a certain threshold value, etc. A data provider system 170 (e.g., a substitute item selector 172) can use attributes of an item initially selected by a user, an item context, a user context, and/or the like to identify one or more potential substitute items. In cases in which a data provider system 170 (e.g., substitute item selector 172) relies on information that is less user dependent to identify one or more potential substitute items (e.g., attributes of an item initially selected by a user, a search query, a user attribute that is one of a few possible values (e.g., whether a user is a member of a program or subscription), etc.), the data provider system 170 (e.g., substitute item selector 172) can cache a mapping between an item initially selected by a user, information relied upon to identify potential substitute items, and/or the one or more potential substitute items that are identified. Thus, the data provider system 170 (e.g., substitute item selector 172) may not have to perform operations to identify which potential substitute items to return to the item recommender 130 in response to a user selecting an initial item (where such operations can include running a model that takes the initially-selected item as an input). Rather, the data provider system 170 (e.g., substitute item selector 172) can simply access the cache in order to identify which potential substitute items should be returned to the item recommender 130 in response to a particular user selecting an initial item. Ultimately, this reduces the amount of computing resources and/or hardware involved in identifying potential substitute items, freeing up additional computing resources and/or hardware for use by other processes of the recommendation system.

In further embodiments, the network-accessible system 120 and/or the item recommender 130 can function as an externally-facing service in which an identification of an item in an electronic catalog is received as an input and a substitute item (optionally with an explanation of why the substitute item is being recommended) is returned as an output. For example, a user device 102 can submit an application programming interface (API) call to the network-accessible system 120 (and/or the item recommender 130). The user device 102 can submit the API call in response to the user device 102 accessing a specific content page that returns a substitute item for a user-provided item, in response to the user device 102 accessing a content page that includes a link to or identification of an item (e.g., a blog post), and/or the like. The API call may include an identification of an item in an electronic catalog (e.g., the name or ID of the item, one or more keywords associated with the item, etc.). The network-accessible system 120, the item recommender 130, the user interface generator 144, and/or the data provider systems 170 can then perform the operations described herein to identify a substitute item. The network-accessible system 120 (and/or the item recommender 130) can then return to the user device 102 an identification of the substitute item, an explanation of why the substitute item is being returned in response to reception of the API call (e.g., an explanation indicating how or why the substitute item is better than the item identified in the API call), and/or a link to a content page of the substitute item. In some cases, some or all of the returned information can be automatically inserted into a content page accessed by the user device 102 (e.g., a blog post) for display. Alternatively or in addition, the network-accessible system 120 can return to the user device 102 user interface data that, when rendered by the user device 102 or another user device 102 operated by another user (e.g., another user accessing an article written by a user operating the user device 102 from which the API call originated), causes the user device 102 (or other user device 102) to render and display or otherwise present a content page depicting the item identified in the API call and/or a substitute item in a manner as described herein.

As an illustrative example, a blogger may be writing an article about a first item in an electronic catalog and may want to suggest an alternative item also available in the electronic catalog. The blogger, using a user device, can access a content page (e.g., served by the network-accessible system 120 and/or the item recommender 130) and identify the first item (e.g., by entering the name or ID of the first item and/or a keyword associated with the first item in a text box). In return, the content page may display an identification of a substitute item, an explanation of why the substitute item is being recommended, and/or a link to a content page for the substitute item. The blogger can then insert the link and/or other information identifying the substitute item in the article. In some cases, a user can enter an identification of an item in a widget, toolbar, or other browser application feature, and substitute item information (e.g., substitute item attributes, a link to the substitute item content page, etc.) determined by the network-accessible system 120, the item recommender 130, and/or the data provider systems 170 may be returned in response.

The network-accessible system 120, the item recommender 130, the user interface generator 144, the AI-based item selection optimizer 146, and/or the data provider systems 170 may each be a single computing device, or may include multiple distinct computing devices, such as computer servers, logically or physically grouped together to collectively operate as a server system. The components of the the network-accessible system 120, the item recommender 130, the user interface generator 144, the AI-based item selection optimizer 146, and/or the data provider systems 170 can each be implemented in application-specific hardware (e.g., a server computing device with one or more ASICs) such that no software is necessary, or as a combination of hardware and software. In addition, the modules and components of the network-accessible system 120, the item recommender 130, the user interface generator 144, the AI-based item selection optimizer 146, and/or the data provider systems 170 can be combined on one server computing device or separated individually or into groups on several server computing devices. In some embodiments, the network-accessible system 120, the item recommender 130, the user interface generator 144, the AI-based item selection optimizer 146, and/or the data provider systems 170 may include additional or fewer components than illustrated in FIG. 1.

In some embodiments, the features and services provided by the network-accessible system 120, the item recommender 130, the user interface generator 144, the AI-based item selection optimizer 146, and/or the data provider systems 170 may be implemented as web services consumable via the communication network 110. In further embodiments, the network-accessible system 120, the item recommender 130, the user interface generator 144, the AI-based item selection optimizer 146, and/or the data provider systems 170 are provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The items data store 150 stores attributes for various items (e.g., products like books, clothing, electronics, etc.; video, such as television shows, movies, etc.; music; etc.), contexts of such items, and/or the like. While the items data store 150 is depicted as being located external to the network-accessible system 120, the item recommender 130, the user interface generator 144, the AI-based item selection optimizer 146, and the data provider systems 170, this is not meant to be limiting. For example, in other embodiments not shown, the items data store 150 is located internal to the item recommender 130.

The user data store 160 stores user data for various users and/or user devices 102 (e.g., user interests, user hobbies, user age, user gender, user purchase history, user search history and/or current search queries, user subscriptions, actions performed by the user in prior browsing sessions, parts of a screen a user typically clicks while browsing, a time of day, a season of the year, etc.). While the user data store 160 is depicted as being located external to the network-accessible system 120, the item recommender 130, the user interface generator 144, the AI-based item selection optimizer 146, and the data provider systems 170, this is not meant to be limiting. For example, in other embodiments not shown, the user data store 160 is located internal to the item recommender 130.

While the network-accessible system 120, the item recommender 130, the user interface generator 144, the AI-based item selection optimizer 146, the items data store 150, the user data store 160, and/or the data provider systems 170 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a catalog page delivery service) can communicate with one or more of the user devices 102 via the network 110.

The operating environment 100 may optionally include a network server 190. The network server 190 may communicate with one or more user devices 102 via the network 110. The network server 190 may include physical hardware components (e.g., one or more processors, memory, input/output interfaces, network interfaces, an internal bus, etc.) and may be physically and/or logically isolated from the other components in the network environment 100 (e.g., the network-accessible system 120, the item recommender 130, the user interface generator 144, the AI-based item selection optimizer 146, the items data store 150, the user data store 160, and/or the data provider systems 170). The network server 190 may include website generating services and/or databases to perform various functions, such as implementing a blog, a news source, an entertainment site, a shopping site, and/or the like. As an illustrative example, a user device 102 may communicate with the network server 190 to access a content page corresponding to a blog post. The blog post may include a link to or identification of an item in an electronic catalog, and the user device 102 can then submit an API call to the network-accessible system 120 and/or the item recommender 130 including an identification of the item. The network-accessible system 120 and/or the item recommender 130 may return information identifying a substitute item, which can optionally be inserted into the content page corresponding to the blog post.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In one embodiment, the user devices 102 runs a browser application in order to communicate with the network-accessible system 120 (and/or the catalog page delivery service).

In some embodiments, the network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagrams for Serving a Requested Content Page

Figure 2A:
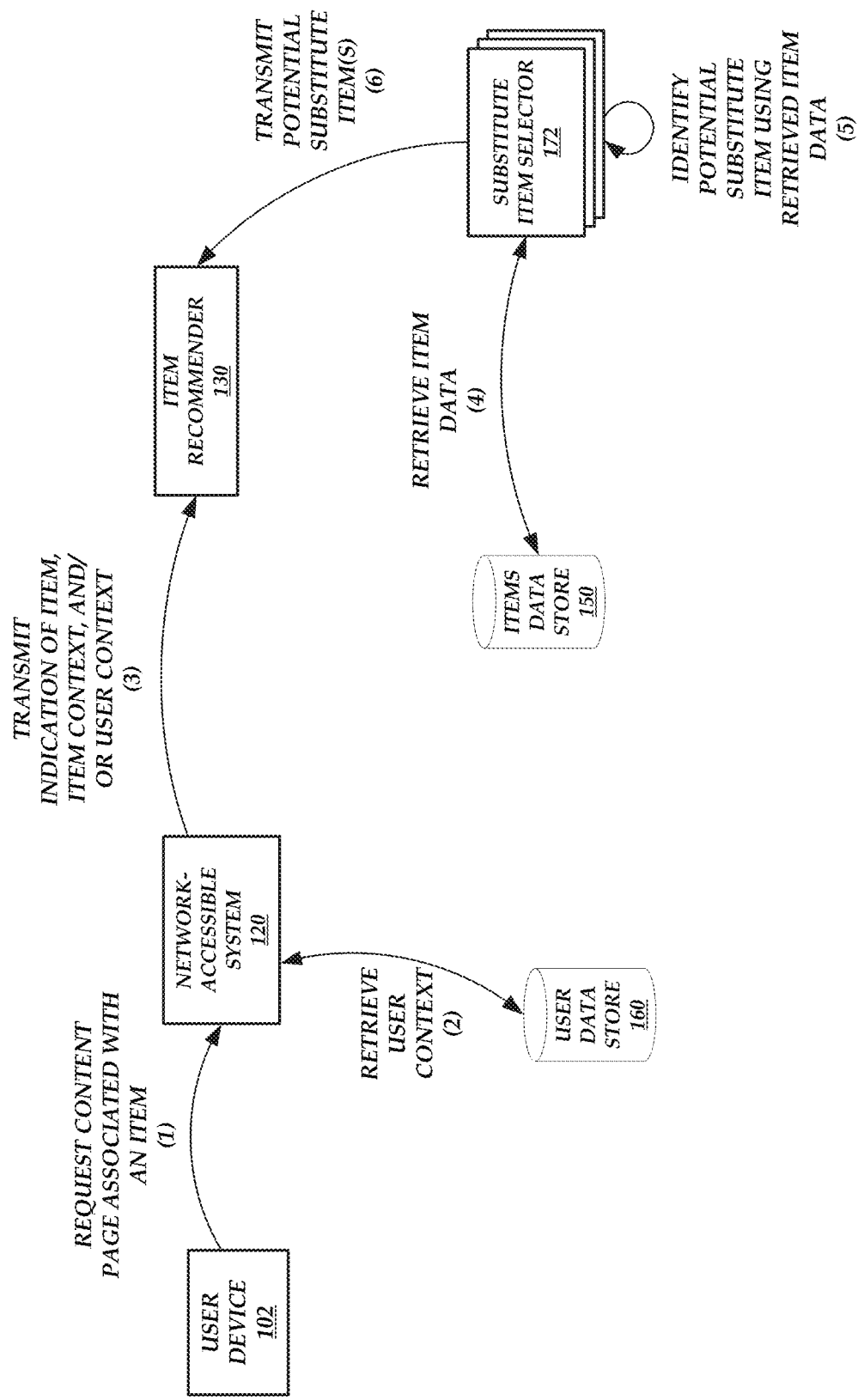
FIGS. 2A-2B are block diagrams of the operating environment of FIG. 1 illustrating the operations performed by the components of the operating environment of FIG. 1 to serve a requested content page, according to one embodiment.
Figure 2B:
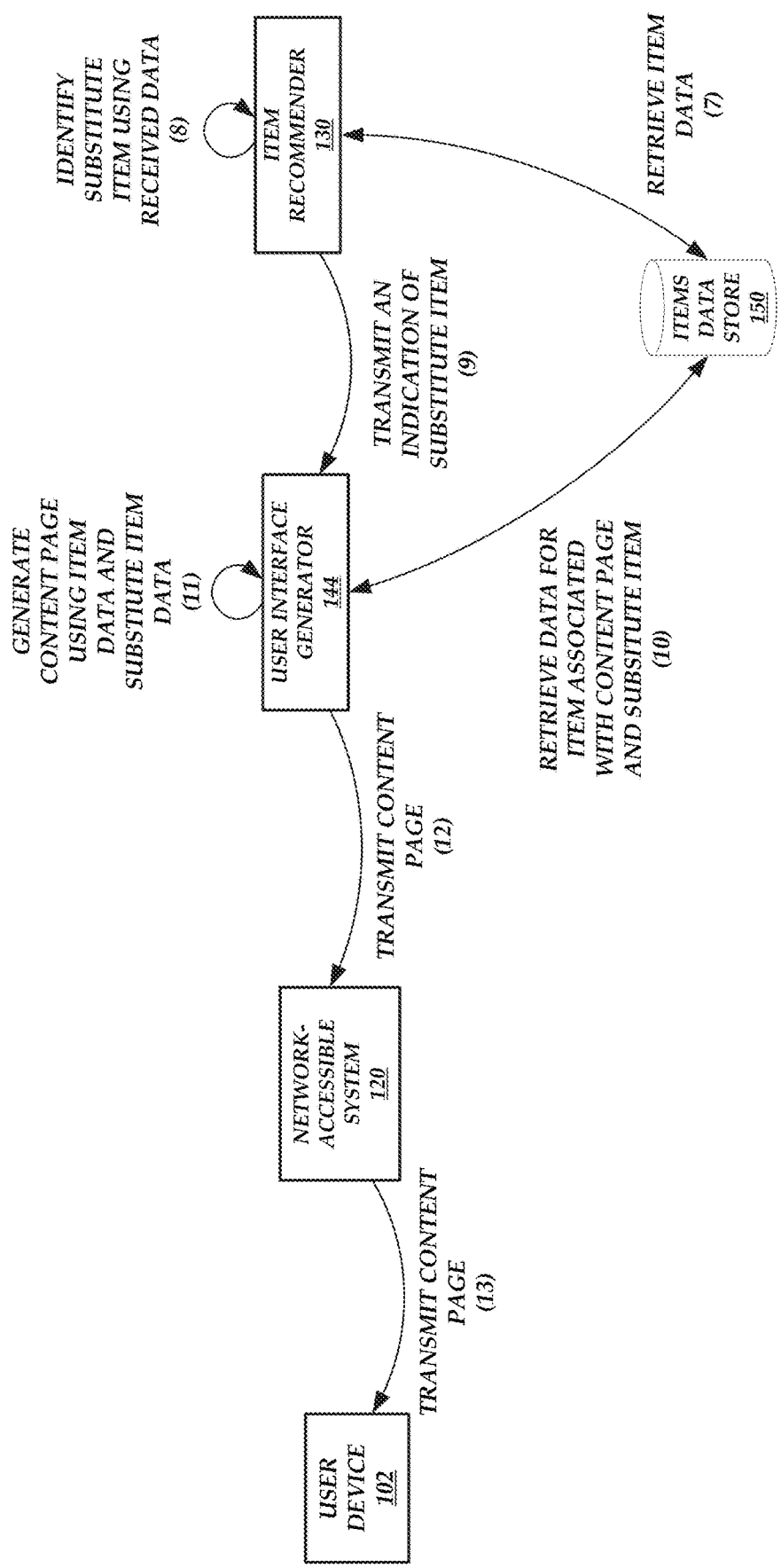

FIGS. 2A-2B are block diagrams of the operating environment 100 of FIG. 1 illustrating the operations performed by the components of the operating environment 100 to serve a requested content page, according to one embodiment. As illustrated in FIG. 2A, a user device 102 requests a content page associated with an item from the network-accessible system 120 at (1). The request may include an indication of an item associated with the requested content page, a context of the item, a search query that resulted in selection of the item associated with the requested content page, an identity of a user and/or user device 102 that submitted the request, and/or the like.

In response, the network-accessible system 120 retrieves a user context from the user data store 160 at (2). The network-accessible system 120 can then transmit an indication of the item associated with the requested content page, a context of the item associated with the requested content page, and/or the user context to the item recommender 130 at (3).

Before, during, and/or after the network-accessible system 120 provides the item and user context information to the item recommender 130, some or all of the substitute item selectors 172 can each retrieve item data from the items data store 150 at (4). For example, the item data can include attributes of the item associated with the requested content page and/or attributes for one or more other items that may be related to the item associated with the requested content page. The substitute item selector(s) 172 can then each identify a potential substitute item using the retrieved item data at (5). For example, the network-accessible system 120 can provide the search query that resulted in the user device 102 requesting the content page (as provided in the content page request) to the substitute item selector(s) 172. The substitute item selector(s) 172 can each use the search query to identify one or more items that may be the same as or similar to the item associated with the requested content page. The substitute item selector(s) 172 can then each apply the retrieved item data corresponding to the identified one or more items to a model that outputs a potential substitute item. The substitute item selector(s) 172 can then transmit an indication of potential substitute item(s) to the item recommender 130 at (6).

As illustrated in FIG. 2B, the item recommender 130 can retrieve item data from the items data store 150 at (7). For example, the item data may include attributes of the item associated with the requested content page and/or attributes of the potential substitute item(s) provided by the substitute item selector(s) 172. The item recommender 130 can then identify a substitute item using the received data at (8). For example, the item recommender 130 can use a multi-armed bandit approach to identify the substitute item. As described herein, the identified substitute item may be one of the potential substitute item(s) provided by the substitute item selector(s) 172. The item recommender 130 can then transmit an indication of the substitute item to the user interface generator 144 at (9). The item recommender 130 can also transmit an indication of a strategy used to identify the substitute item to the user interface generator 144.

The user interface generator 144 can retrieve, from the items data store 150, data for the item associated with the requested content page and for the substitute item at (10). For example, the data can include attributes of the item associated with the requested content page and attributes of the substitute item. The user interface generator 144 can also generate a label for the substitute item using the indicated strategy. The user interface generator 144 can then generate a content page for display in a user interface using the data for the item associated with the requested content page and for the substitute item (and/or the generated label) at (11). For example, the user interface generator 144 may generate user interface data that, when rendered by the user device 102, may cause the user device 102 to display or otherwise present the content page in a user interface. The generated content page may include a section or window dedicated to the substitute item, where the substitute item is labeled to identify why the substitute item is being suggested to the user (e.g., how or why the substitute item is better than the initially-selected item). Additional features of the content page are described in greater detail below with respect to FIGS. 5A-5B and 6.

The user interface generator 144 can then transmit the content page (e.g., the user interface data) to the network-accessible system 120 at (12). The network-accessible system 120 can then transmit the content page to the user device 102 at (13) to satisfy the initial content page request.

Example Block Diagram for Updating the Substitute Item Selection Process

Figure 3:
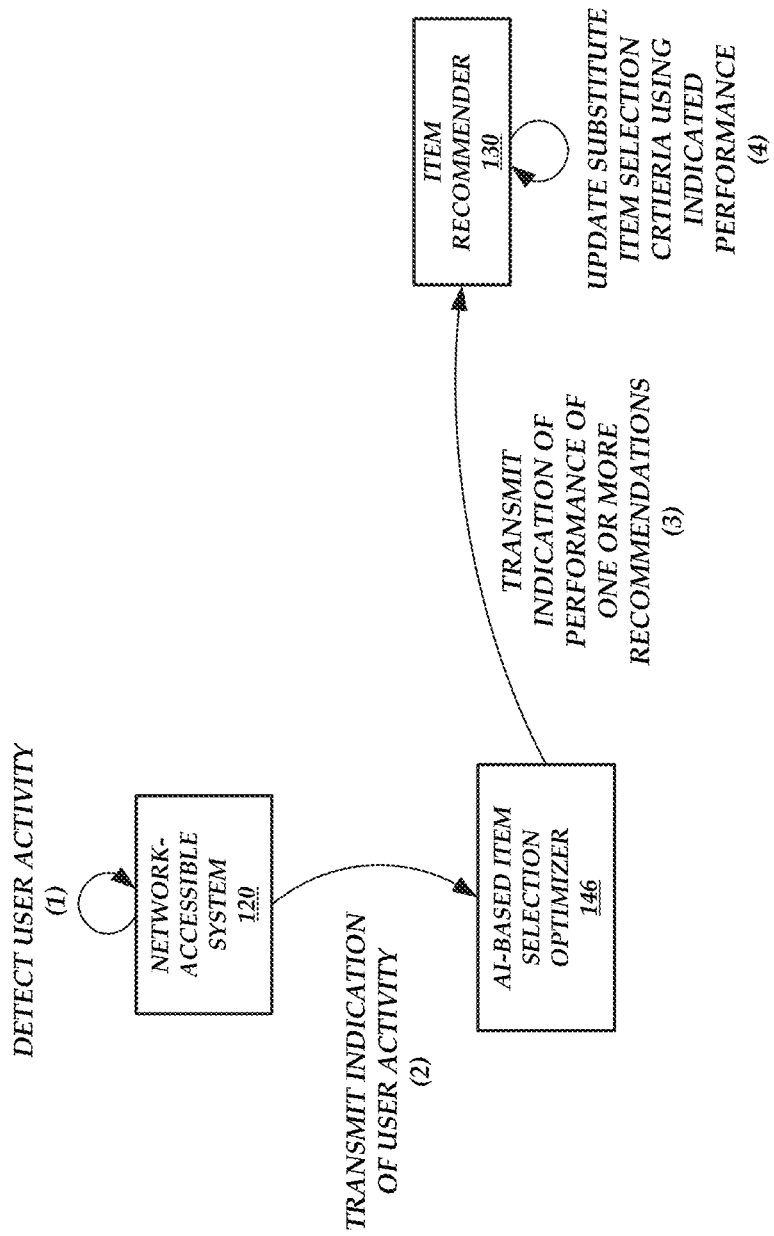
FIG. 3 is a block diagram of the operating environment of FIG. 1 illustrating the operations performed by the components of the operating environment of FIG. 1 to update the substitute item selection process, according to one embodiment.

FIG. 3 is a block diagram of the operating environment 100 of FIG. 1 illustrating the operations performed by the components of the operating environment 100 to update the substitute item selection process, according to one embodiment. For example, a content page may have been delivered to a user device 102, and the user operating the user device 102 may be interacting with the page. As illustrated in FIG. 3, the network-accessible system 120 may detect this user activity at (1). For example, the user activity may include an indication of whether the user selected a substitute item presented on the content page, whether the user selected another item that was recommended and presented on the content page, whether the user selected and purchased the substitute item presented on the content page, whether the user purchased the item associated with the content page (e.g., the item featured on the content page), the strategy that resulted in the selection of the substitute item being presented on the content page, and/or the like. The network-accessible system 120 can transmit an indication of this user activity to the AI-based item selection optimizer 146 at (2).

The AI-based item selection optimizer 146 can receive an indication of user activity from the network-accessible system 120 for various users interacting with various content pages. The AI-based item selection optimizer 146 can aggregate or otherwise collect these indications and determine a performance of one or more recommendations. For example, the AI-based item selection optimizer 146 can identify how often a recommendation of a substitute item led to the substitute item being purchased. The AI-based item selection optimizer 146 can transmit an indication of the performance of one or more recommendations at (3) to the item recommender 130.

The item recommender 130 can update substitute item selection criteria using the indicated performance at (4). For example, the AI-based item selection optimizer 146 can apply the indicated performance as an input to a machine learning model, and the machine learning model can produce an output identifying which strategies (e.g., positive factors) and/or item attributes were more likely to lead to a particular user selecting and/or purchasing an item. The AI-based item selection optimizer 146 can then use the machine learning model output to generate instructions for adjusting, updating, and/or re-training the machine learning model used by the item recommender 130 to identify a substitute item (e.g., instructions for adjusting, updating, and/or re-training the machine learning model used by the item recommender 130 to identify a substitute item to consider additional and/or different criteria when selecting a substitute item). The AI-based item selection optimizer 146 can include the generated instructions in the transmission to the item recommender 130 indicating the performance of one or more recommendations. By causing the item recommender 130 to update the substitute item selection criteria, the AI-based item selection optimizer 146 can improve the accuracy and/or predictive ability of the substitute item selection process implemented by the recommendation system over time as feedback is gathered from various users.

Example Improved User Interface Generation Routine

Figure 4:
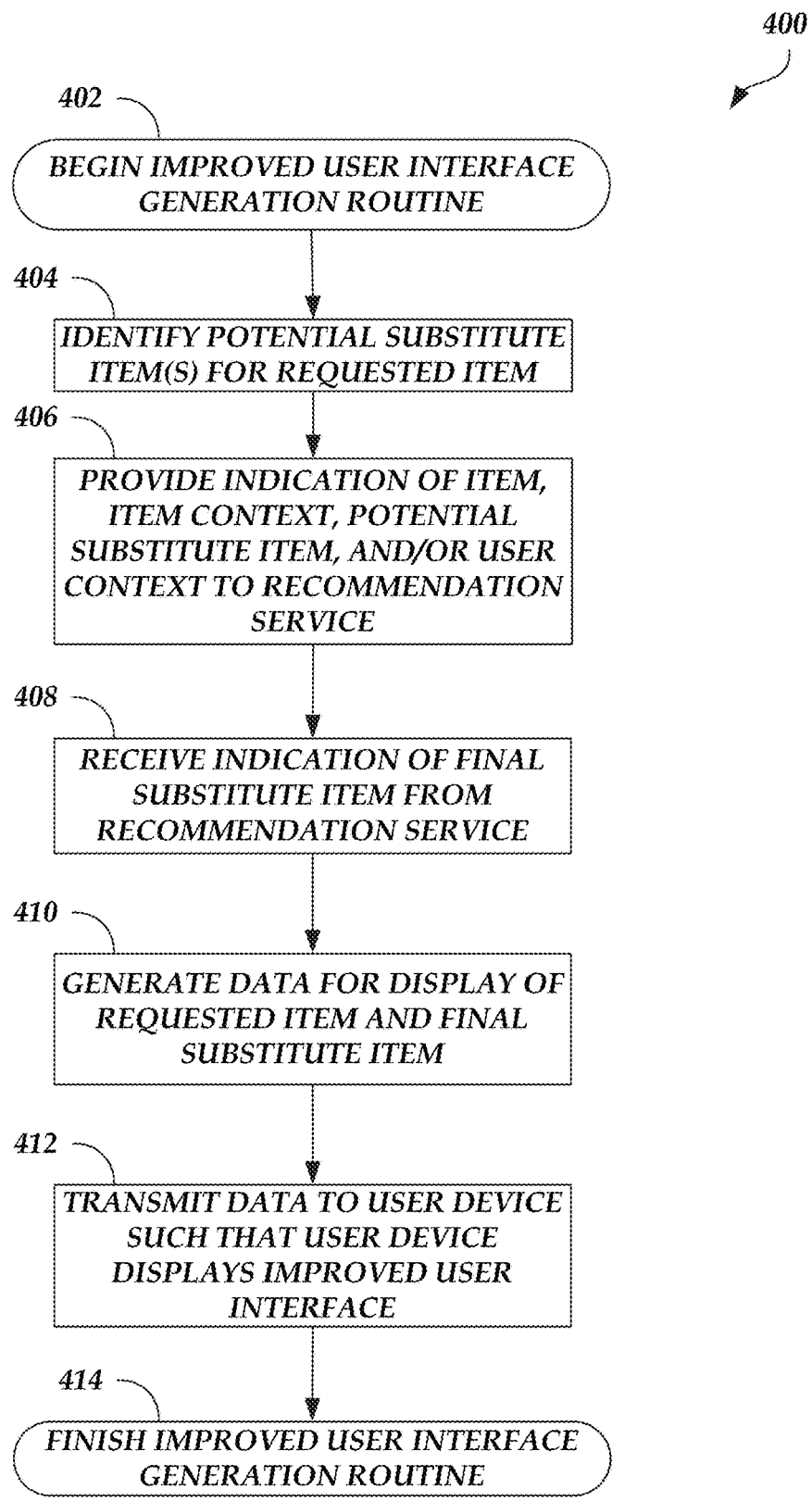
FIG. 4 is a flow diagram depicting an improved user interface generation routine illustratively implemented by a recommendation system, according to one embodiment.

FIG. 4 is a flow diagram depicting an improved user interface generation routine 400 illustratively implemented by a recommendation system, according to one embodiment. As an example, the network-accessible system 120, the item recommender 130, the user interface generator 144, and/or the data provider system(s) 170 of FIG. 1 can be configured to execute the improved user interface generation routine 400. The improved user interface generation routine 400 begins at block 402.

At block 404, potential substitute item(s) are identified for a requested item. For example, the requested item may be an item initially selected by a user, and the potential substitute item(s) may be comparable to the requested item. The potential substitute item(s) may be identified by one or more data provider systems 170.

At block 406, an indication of the requested item, a context of the requested, an indication of the potential substitute item, and/or a user context is provided to a recommendation service. For example, the recommendation service may be the item recommender 130.

At block 408, an indication of a final substitute item is received from the recommendation service. For example, the final substitute item may be one of the potential substitute item(s) provided to the recommendation service. The final substitute item may be received by the user interface generator 144 from the item recommender 130.

At block 410, data for display of the requested item and the final substitute item is generated. For example, the data (e.g., user interface data), when rendered, may cause a user device 102 to display or otherwise present a user interface in which the final substitute item is highlighted in a specific section of window in an ATF portion of the user interface.

At block 412, the data is transmitted to a user device such that the user device renders and displays (or otherwise presents) the improved user interface. Once the data is transmitted, the improved user interface generation routine 400 ends, as shown at block 414.

Example Improved User Interfaces

Figure 5A:
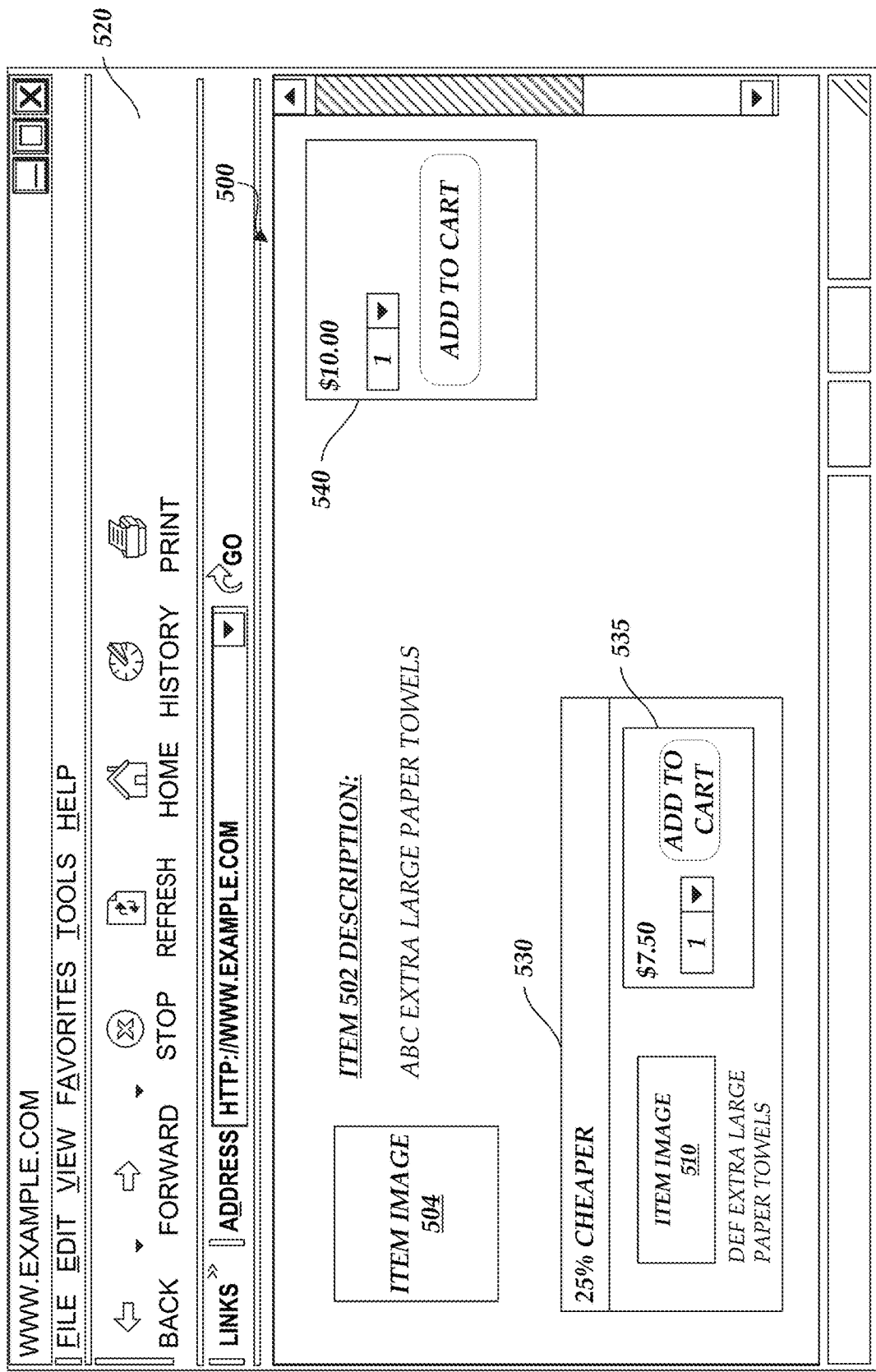
FIGS. 5A-5B illustrate example user interfaces depicting a content page that is displayed in a browser application running on a user device, such as the user device of FIG. 1.
Figure 5B:
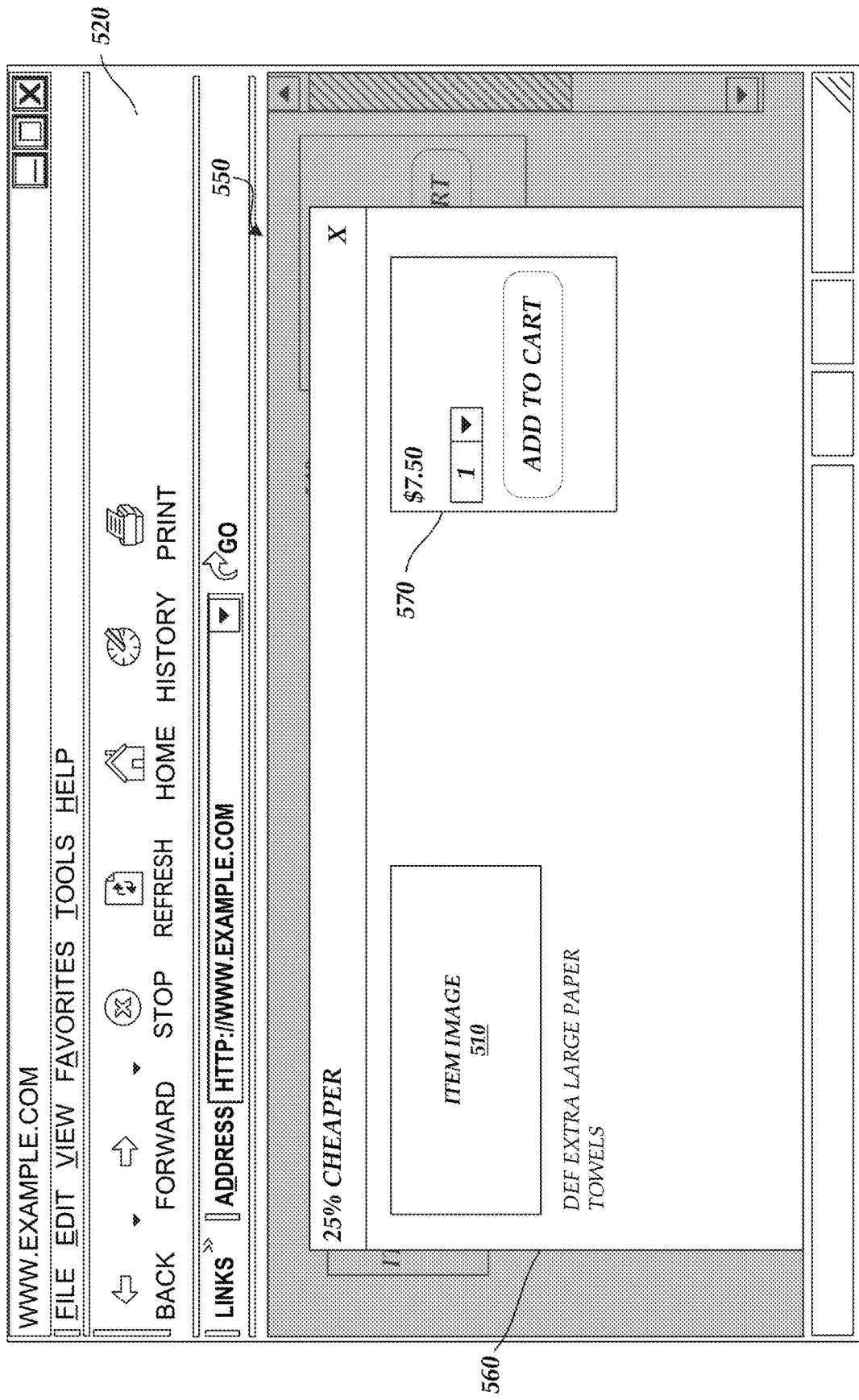

FIGS. 5A-5B illustrate example user interfaces 500 and 550 depicting a content page that is displayed in a browser application 520 running on a user device, such as the user device 102 of FIG. 1. For example, FIGS. 5A-5B illustrate user interfaces 500 and 550 displayed in the browser application 520 running on a laptop or desktop. The user interface data that, when rendered, causes the user device 102 to display or otherwise present the user interfaces 500 and/or 550 may have been generated by the user interface generator 144.

As illustrated in FIG. 5A, the content page is for an item 502 (e.g., the item initially selected by the user). The user interface 500 includes an item 502 description as well as an image 504 of the item 502. Below (e.g., after) the item 502 description and image 504 is a display object 530 that depicts a substitute item. The display object 530 may be displayed in a different window, container, table, frame, etc. than the item 502 description and the image 504. For example, the item 502 may be extra large paper towels manufactured by ABC. The item recommender 130 may have identified a particular substitute item (e.g., extra large paper towels manufactured by DEF) to recommend to the user in response to the user requesting the content page corresponding to the item 502. In response, the user interface generator 144 generated a label for the substitute item (e.g., "25% Cheaper") indicating why the substitute item is being recommended (e.g., indicating how or why the substitute item is better than the initially-selected item), retrieved attributes of the substitute item, and included one of more of the retrieved attributes (e.g., image 510, ratings, descriptions, price, etc.) and/or the label in the display object 530.

Optionally, the display object 530 further includes a display object 535 in which a price of the substitute item is displayed, along with an option to purchase or obtain the substitute item (e.g., an "add to cart" button and/or a "buy now" or "1-click" button (not shown), where selection of the "add to cart" button may add the substitute item to a user's cart and allow the user to continue browsing the electronic catalog before payment information is requested (optionally providing a notification in the user interface 500 that the substitute item has been added to the cart), and where selection of the "buy now" button may cause the user interface 500 to display a payment page for purchasing the substitute item and/or may automatically cause the substitute item). Thus, the number of navigational steps performed by the user may be reduced because the user now does not have to view the item initially selected, scroll to and/or select the substitute item (which would cause the user interface 500 to transition to a new content page corresponding to the substitute item), and then select a substitute item purchase option. This may be especially true in situations in which the substitute item is more desirable to the user than the item initially selected. Display objects 530 and/or 535 may be programmatically-generated selectable links to additional information, such as any additional information related to the substitute item described herein. Selecting the display objects 530 and/or 535 may cause the user interface 500 to display a new content page providing the additional information and/or a pop-up window overlaying the current view that provides the additional information.

The user interface 500 further includes a display object 540 in which a price of the item 502 is displayed, along with an option to purchase or obtain the item 502 (e.g., the "add to cart" button). The display object 530 may be positioned such that, at a minimum, the substitute item is visible at the same time that the item 502 price and/or purchase option is visible. For example, the display object 530 may be positioned in the ATF portion of the user interface 500. Thus, the substitute item may be visible to the user without requiring the user to perform any navigational steps and while the user is making a purchase decision. Placing the display object 530 BTF, on the other hand, may result in a user making a purchase decision before seeing, and therefore considering, the substitute item.

Alternatively, not shown, the display object 530 can be positioned within the display object 540, such as above (e.g., before) the portion of the display object 540 that depicts the item 502 price and/or the purchase option. Thus, the user may be forced to view the substitute item before being able to purchase the item 502.

Alternatively or in addition, the display object 540 may include a "buy now" or "1-click" button (not shown) above, below, and/or to the side of the "add to cart" button. Selection of the "add to cart" button may add the item 502 to a user's cart and allow the user to continue browsing the electronic catalog before payment information is requested (optionally providing a notification in the user interface 500 that the item 502 has been added to the cart). Selection of the "buy now" button, however, may cause the user interface 500 to display a payment page for purchasing the item 502 and/or may automatically cause the item 502 to be purchased.

In some embodiments, hovering over the substitute item with a cursor may cause a tooltip, a pop-up window, and/or another type of window to appear in the user interface 500. The tooltip, pop-up window, and/or other type of window may depict additional attributes of the substitute item not displayed in the display object 530 due to user interface 500 space constraints.

Selection of the substitute item may cause the user interface 500 to display a content page for the substitute item. In an embodiment, the content page for the substitute item may not include any display object, such as the display object 530, that depicts a substitute item. Thus, the content pages may not include a cascading set of substitute items. However, whether a content page depicts a substitute item may depend on the manner in which a user arrives at the content page, not necessarily on the item itself. For example, if the user selects the substitute item depicted in the display object 530, the user interface 500 may display the content page for the substitute item without a further substitute item being depicted. On the other hand, if the user initially requested the content page for the substitute item (without first navigating to the item 502 content page), then the user interface 500 may display a display object depicting a further substitute item (e.g., large paper towels manufactured by GHI). Any selections (or hovering) performed by the user can be detected by the network-accessible system 120 and used for improving the accuracy of the recommendation system, as described herein.

The user interface 500 may also depict other information related to the item 502, such as user ratings, user reviews, a question and answer section in which users can post questions about the item 502 and/or reply to questions about the item 502, an estimated date of delivery of the item 502 if purchased, variations of item 502 that are available (e.g., different color options for item 502, different size options for item 502, etc.), an item comparison section (e.g., a table showing attributes of the selected item 502 in comparison to other similar items), and/or the like. None, some, or all of this additional information related to the item 502 can be depicted in the user interface 500 above and/or below the display object 530.

Similarly, the display object 530 may also depict other information related to the substitute item, such as user ratings, user reviews, a question and answer section in which users can post questions about the substitute item and/or reply to questions about the substitute item, an estimated date of delivery of the substitute item if purchased, variations of the substitute item that are available (e.g., different color options for the substitute item, different size options for the substitute item, etc.), an item comparison section (e.g., a table showing attributes of the substitute item in comparison to other similar items), and/or the like. None, some, or all of this information can be depicted in the display object 530 or may be viewable in the user interface 500 after the substitute item is selected.

As illustrated in FIG. 5B, the display object 530 is not displayed below the item 502 image 504 and description in the user interface 550. Rather, upon requesting the content page for the item 502, the user interface 550 may cause a roll-up window 560 to appear from a bottom of the user interface 502 and rise to or nearly to the top of the user interface 502. The roll-up window 560 may appear prior to all of the content of the ATF portion of the item 502 content page being visible. For example, the ATF portion of the item 502 content page may be grayed out, and some or all of the content to be depicted in the item 502 content page (e.g., the item 502 image 504, the item 502 description, the display object 540, etc.) may be partially or completely hidden behind the roll-up window 560.

The roll-up window 560 may include the substitute item label, the substitute item image 510, a description of the substitute item, and/or any other substitute item attributes. In addition, the roll-up window 560 may include a display object 570 that allows the user to select and/or purchase the substitute item. Thus, the user may be presented with a purchase decision relating to the substitute item before being able to make a purchase decision with respect to the item 502, which was the item initially selected. By including the display object 570 with the substitute purchase option in the roll-up window 560, the number of navigational steps performed by the user may be reduced because the user now does not have to view the item initially selected, scroll to and/or select the substitute item (which would cause the user interface 550 to transition to a new content page corresponding to the substitute item), and then select a substitute item purchase option. This may be especially true in situations in which the substitute item is more desirable to the user than the item initially selected.

If the substitute item is not of interest to the user, the user can simply close the roll-up window 560 or make a selection in any portion of the user interface 550 outside of the roll-up window 560. Closing the roll-up window 560 and/or making a selection in the user interface 550 outside the roll-up window 560 may cause the roll-up window 560 to disappear. In case the user made a mistake and did not intend to close the roll-up window 560, the user interface 550 may optionally update to display the display object 530 in a manner as described above.

Alternatively, the roll-up window 560 may instead be a roll-down window (e.g., a window that appears from the top of the user interface 550 and drops down), a side-roll window (e.g., a window that appears from the left or right side of the user interface 550 and scrolls toward the opposite side), etc.

While not shown, the user interfaces 500 and/or 550 can depict additional display objects that include items recommended for the user (optionally with labels identifying why the items are being recommended, what attributes of the recommended items are different than the attributes of the initially-selected item, etc.). Such display objects may be positioned below (e.g., after) the display object 530 and/or in the BTF portion of the user interfaces 500 and/or 550. Thus, the user interfaces 500 and/or 550 may depict different tiers of recommendations.

Figure 6:
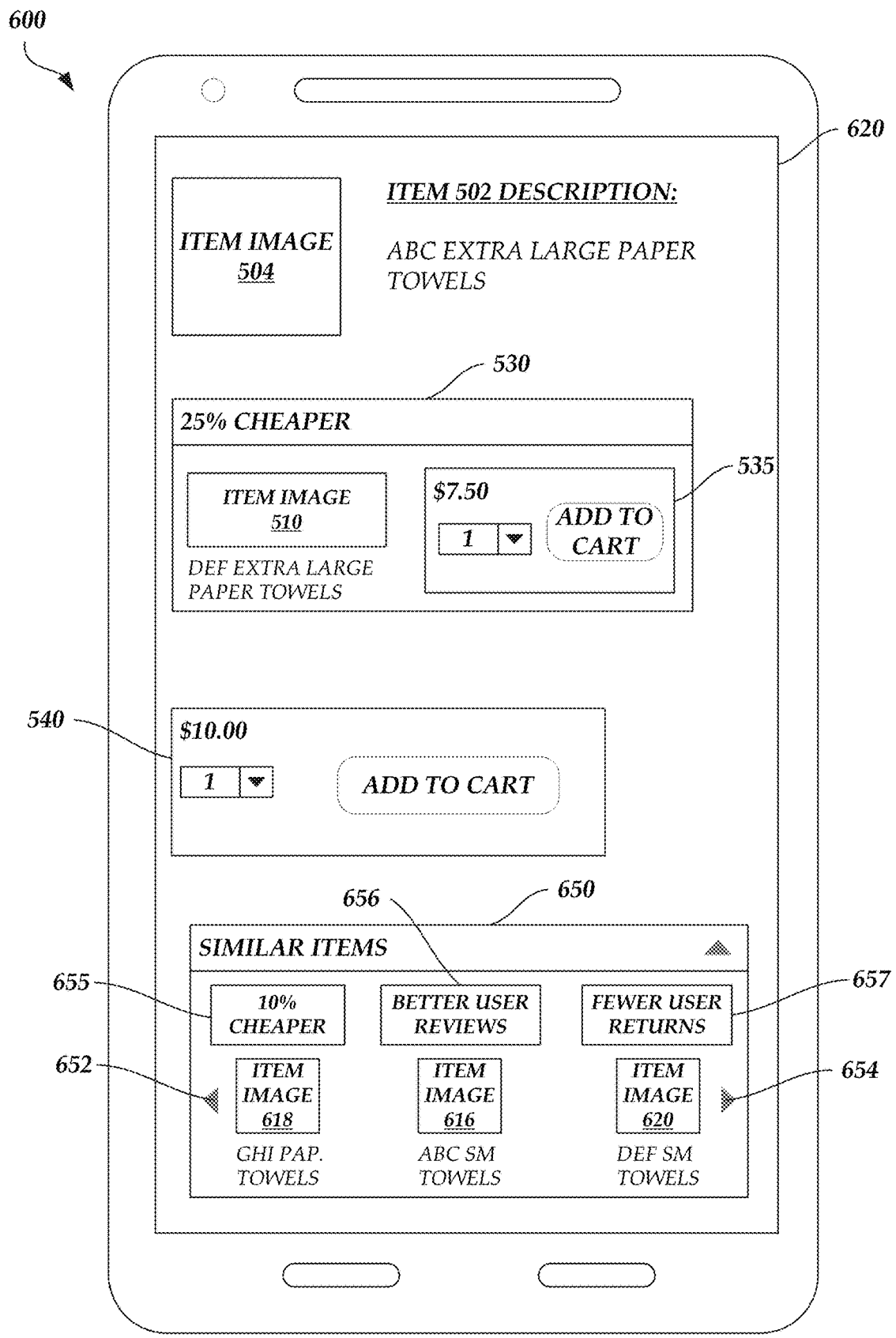
FIG. 6 illustrates an example user interface depicting a content page that is displayed in a browser application running on a user device, such as the user device of FIG. 1.

FIG. 6 illustrates an example user interface 600 depicting a content page that is displayed in a browser application 620 running on a user device, such as the user device 102 of FIG. 1. While FIGS. 5A-5B illustrate user interfaces 500 and 550 displayed by a laptop or desktop, FIG. 6 illustrates the user interface 600 displayed in the browser application 620 running on a mobile device (e.g., tablet, cell phone, etc.). The user interface data that, when rendered, causes the user device 102 to display or otherwise present the user interface 600 may have been generated by the user interface generator 144.

As illustrated in FIG. 6, the content page is for the item 502. The user interface 600 includes the item 502 description as well as the image 504 of the item 502. Below (e.g., after) the item 502 description and image 504 is the display object 530 that depicts a substitute item. As described with respect to FIGS. 5A-5B, the display object 530 may be displayed in a different window, container, table, frame, etc. than the item 502 description and the image 504, may depict a label explaining why the substitute item is being recommended (e.g., indicating how or why the substitute item is better than the initially-selected item), and various attributes of the substitute item (e.g., the image 510, the substitute item description, ratings, price, etc.). In addition, the display object 530 optionally includes the display object 535, which allows a user to purchase or obtain the substitute item directly in the user interface 600.

Given the limited display space offered by mobile devices, it may not be possible to simultaneously display the display object 530 and the display object 540. Thus, the user interface 600 may be configured such that the display object 530 is positioned above (e.g., before) the display object 540. The user, therefore, may have to scroll past the display object 530 and view the substitute item before being able to select and/or purchase the item 502. The user may be more interested in the substitute item than the item 502. Accordingly, positioning the display object 530 above (e.g., before) the display object 540 may cause the user to perform fewer navigational steps. In particular, positioning the display object 540 above (e.g., before) the display object 530 may cause the user to perform additional scrolling in order to view the display object 530. In fact, scrolling on mobile devices can be burdensome, and therefore the user may not even scroll far enough to reach the display object 530 if the display object 530 is positioned below the display object 540. This may result in the user navigating back to a previous content page, selecting another result in an existing search, entering a new search query, and/or otherwise navigating to one or more additional content pages before arriving at a content page for the substitute item.

In some embodiments, the display object 530 is in an ATF portion of the user interface 600 and/or the display object is in either an ATF portion or a BTF portion of the user interface 600. In other embodiments, the display object 530 is in a BTF portion of the user interface 600. However, the display object 530 may be the first content that is viewable once the user scrolls below the ATF portion of the user interface 600.

The user interface 600 may further include a display object 650 that depicts one or more other items that are recommended for the user. Optionally, the display object 650 may include an explanation of why some or all of the item(s) are being recommended for the user (e.g., a label corresponding to a recommended item indicating that the item is cheaper, a label corresponding to a recommended item indicating an attribute of the recommended item that is not present in the initially-selected item, a label corresponding to a recommended item indicating an attribute of the initially-selected item that is not present in the recommended item, a label corresponding to a recommended item indicating that the recommended item has better user reviews than the initially-selected item, a label corresponding to a recommended item indicating that the recommended item is returned less than the initially-selected item, etc.). The display object 650 may include a single label for all recommended items displayed in the display object 650, multiple labels that each correspond to some, but not all, of the recommended items displayed in the display object 650, multiple labels that each correspond to a single recommended item displayed in the display object 650, and/or any combination thereof. For example, the display object 650 may depict a first item (e.g., GHI paper towels) with an item image 618 that is associated with a first label 655 indicating that the first item is 10% cheaper than the initially-selected item. The display object 650 may further depict a second item (e.g., ABC small paper towels) with an item image 616 that is associated with a second label 656 indicating that the second item has better user reviews than the initially-selected item, and a third item (e.g., DEF small paper towels) with an item image 618 that is associated with a third label 657 indicating that the third item has fewer user returns than the initially-selected item. The display object 650 may also be labeled indicating that these three items (and/or additional recommended item(s)) are similar to the initially-selected item. The display object 650 may be a carousel view in which left arrow 652 or right arrow 654 can be selected to view additional items recommended for the user. Selection of the left arrow 652 and/or the right arrow 654 may cause one or more of the items currently depicted in the display object 650 to disappear and other items to appear (optionally along with corresponding labels). Thus, the user interface 600 may depict multiple levels or tiers of recommendations.

The display object 650 may be positioned below the display objects 530 and 540 because, for example, the recommendation system (e.g., the item recommender 130) may determine that the likelihood a user selects one of the items depicted in the display object 650 is lower than the likelihood that the user selects the item 502 or the substitute item. However, if the recommendation system (e.g., the item recommender 130) determines that the likelihood that the user selects one of the items depicted in the display object 650 is higher than the likelihood that the user selects the item 502, for example, then the display object 650 may be positioned above (e.g., before) the display object 540.

The user interface 600 may also depict other information related to the item 502, such as user ratings, user reviews, a question and answer section in which users can post questions about the item 502 and/or reply to questions about the item 502, an estimated date of delivery of the item 502 if purchased, variations of item 502 that are available (e.g., different color options for item 502, different size options for item 502, etc.), an item comparison section (e.g., a table showing attributes of the selected item 502 in comparison to other similar items), and/or the like. None, some, or all of this additional information related to the item 502 can be depicted in the user interface 600 above and/or below the display object 530, above and/or below the display object 540, and/or above and/or below the display object 650.

Similarly, the display object 530 may also depict other information related to the substitute item, such as any of the other information described above with respect to FIG. 5A. None, some, or all of this information can be depicted in the display object 530 or may be viewable in the user interface 600 after the substitute item is selected.

While not shown, the user interface 600 may instead display a roll-up window, a roll-down window, a side window, and/or the like prior to the user being able to view all of the content present in the ATF portion of the user interface 600, in a manner as described above with respect to FIG. 5B.

Introducing the display object 530 and/or the roll-up window 560 into the user interfaces 500, 550, and/or 600 may increase the file size of the user interface data used to render the content pages. In particular, introducing the display object 530 and/or the roll-up window 560 may increase the amount of content to be retrieved, loaded, and/or rendered in the ATF portion of the content page (e.g., because now the substitute item image, description, and/or other attributes are retrieved, loaded, rendered, etc.). This, by itself, can increase the user device 102 page load time. However, on the whole, introducing the display object 530 and/or the roll-up window 560 may reduce the user device 102 page load time. For example, the user interface generator 144 may initially retrieve a lower quality version of the substitute item image. The display object 530, therefore, may initially depict a lower quality version of the substitute item image. After the initial page load is complete (or after the ATF portion of the content page is loaded), the user interface generator 144 may retrieve a higher quality version of the substitute item image, and the user interface 500, 550, and/or 600 may be updated accordingly. As another example, the user interface generator 144 may generate user interface data such that the substitute item image is not initially displayed in the display object 530. Rather, the user interface 500, 550, and/or 600 may be updated to include the substitute item image after the initial page load is complete (or after the ATF portion of the content page is loaded). As another example, introduction of the display object 530 may allow other display objects that depict other recommended items to be discarded, especially as the accuracy of the recommendation system improves (e.g., due, in part, to the operations performed by the AI-based item selection optimizer 146). In other words, the different tiers or levels of recommendations can be simplified into a smaller number of recommendation tiers or levels. As an illustrative example, the display object 530 can replace the need for the display object 650 to be included in the user interface 600. Because the display object 530 depicts a fewer number of recommended items (e.g., a single substitute item), the file size of the user interface data may actually decrease even with the display object 530 being present.

While the user interfaces 500, 550, and 600 are illustrated as being directed to paper towels or other like items, this is not meant to be limiting. Similar techniques can be used to identify substitute videos, to identify substitute music, to identify substitute restaurants, to identify substitute books, and/or to identify any other type of related content in which at least one attribute is available (e.g., in the case of videos or music, duration, genre, artist, album, title, actor, producer, director, tracks, release date, etc.). A modified version of the user interfaces 500, 550, and/or 600 can therefore display substitute videos, substitute music, etc. with labels that identify why the media is being recommended and/or how or why the media is better than the initially-selected media (e.g., "Scarier Film," "More Popular Artist," "More Award-Winning Director," "Newer Release Date," etc.).

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   an items data store configured to store attributes for a plurality of catalog items available in an electronic catalog; and
   a computing system comprising a processor and computer-executable instructions, wherein the computer-executable instructions, when executed, cause the computing system to:
   respond to a submission from a user device of a search query by outputting to the user device a list of catalog items that are responsive to the search query;
   receive a request from the user device for an item detail page associated with a first catalog item of the plurality of catalog items, said request generated in response to user selection on the user device of the first catalog item from the list of catalog items that are responsive to the search query;
   select, in response to the request for the item detail page, a substitute catalog item to present on the item detail page, wherein selecting the substitute catalog item comprises (1) identifying catalog items selected by a plurality of users who have submitted the search query, and (2) selecting the substitute catalog item from the identified catalog items based at least partly on a comparison of attributes of the identified catalog items to attributes of the first catalog item;
   generate user interface data that, when rendered by the user device, causes the user device to display the item detail page with a display of the substitute catalog item positioned below a description of the first catalog item and above a user interface element that allows a user to obtain the first catalog item; and
   transmit the user interface data to the user device.

2. The system of claim 1, wherein the computer-executable instructions, when executed, further cause the computing system to generate a label for the substitute catalog item, wherein the label identifies a benefit not possessed by the first catalog item.

3. The system of claim 1, wherein the computer-executable instructions cause the computing system to select the substitute catalog item using a multi-armed bandit approach.

4. The system of claim 1, wherein the computer-executable instructions, when executed, further cause the computing system to incorporate into the item detail page, separately from and below a display of the substitute catalog item, a carousel user interface that displays additional substitute catalog items.

5. A computer-implemented method, comprising:
   receiving a submission of a search query from a user device;
   generating, and outputting to the user device in response to the submission, a user interface that lists catalog items that are responsive to the search query;
   receiving a request from the user device for an item detail page for a first catalog item, said request generated in response to user selection of the first catalog item from the list of catalog items that are responsive to the search query; and
   responding to the request for the item detail page by a process that comprises:
   selecting a substitute catalog item for the first catalog item based at least partly on (1) the submitted search query, and (2) attributes of the first catalog item;
   generating the item detail page, wherein generating the item detail page comprises incorporating a display of the substitute catalog item into the item detail page below a description of the first catalog item and above a user interface element for selecting the first catalog item for purchase; and
   transmitting the item detail page to the user device.

6. The computer-implemented method of claim 5, wherein selecting the substitute catalog item comprises:
   identifying catalog items that have been selected by users who have submitted the search query; and
   comparing attributes of the identified catalog items to attributes of the first catalog item.

7. The computer-implemented method of claim 5, wherein the process further comprises generating a label that specifies a difference between an attribute of the first catalog item and the attribute of the substitute catalog item, and incorporating the label into the item detail page.

8. The computer-implemented method of claim 5, wherein generating the item detail page further comprises incorporating into the item detail page, separately from and below a display of the substitute catalog item, a carousel user interface that displays additional catalog items that are substitutes for the first catalog item.

9. The computer-implemented method of claim 8, wherein the display of the substitute catalog item is incorporated into an above-the-fold portion of the item detail page, and the carousel user interface is incorporated into a below-the-fold portion of the item detail page.

10. Non-transitory computer storage that stores executable program instructions that direct a computing system to respond to a search query submission from a user device by a process that comprises:
- generating, and outputting to the user device in response to the submission, a user interface that lists catalog items that are responsive to the search query;
- receiving a request from the user device for an item detail page for a first catalog item, said request generated in response to user selection of the first catalog item from the list of catalog items that are responsive to the search query; and
- selecting a substitute catalog item for the first catalog item based at least partly on (1) the submitted search query, and (2) attributes of the first catalog item;
- generating the item detail page in response to the request, wherein generating the item detail page comprises incorporating a display of the substitute catalog item into the item detail page below a description of the first catalog item and above a user interface element for selecting the first catalog item for purchase; and
- transmitting the item detail page to the user device.

11. The non-transitory computer storage of claim 10, wherein selecting the substitute catalog item comprises:
- identifying catalog items that have been selected by users who have submitted the search query; and
- comparing attributes of the identified catalog items to attributes of the first catalog item.

12. The non-transitory computer storage of claim 10, wherein the process further comprises generating a label that specifies a difference between an attribute of the first catalog item and the attribute of the substitute catalog item, and incorporating the label into the item detail page.

13. The non-transitory computer storage of claim 10, wherein generating the item detail page further comprises incorporating into the item detail page, separately from and below a display of the substitute catalog item, a carousel user interface that displays additional catalog items that are related to the first catalog item.

14. The non-transitory computer storage of claim 13, wherein the display of the substitute catalog item is incorporated into an above-the-fold portion of the item detail page, and the carousel user interface is incorporated into a below-the-fold portion of the item detail page.

* * * * *